(12) United States Patent
Maercovich

(10) Patent No.: US 10,767,356 B2
(45) Date of Patent: Sep. 8, 2020

(54) METHOD AND SYSTEM FOR CONTROLLING ACTUATION OF FLUSH APPARATUS

(71) Applicant: Jorge Maercovich, Chatsworth, CA (US)

(72) Inventor: Jorge Maercovich, Chatsworth, CA (US)

(73) Assignee: Advanced Modern Technologies Corporation, Chatsworth, CA (US)

( * ) Notice: Subject to any disclaimer, the term of this patent is extended or adjusted under 35 U.S.C. 154(b) by 0 days.

(21) Appl. No.: 14/262,787

(22) Filed: Apr. 27, 2014

(65) Prior Publication Data

US 2014/0224338 A1 Aug. 14, 2014

Related U.S. Application Data

(60) Continuation-in-part of application No. 13/506,643, filed on May 3, 2012, now Pat. No. 8,739,829, which is a division of application No. 12/927,334, filed on Nov. 12, 2010, now Pat. No. 8,476,547, which is a continuation of application No. 12/460,341, filed on Jul. 16, 2009, now Pat. No. 7,857,280, which is a continuation of application No. 12/454,775, filed on May 21, 2009, now Pat. No. 7,862,001, which is a continuation of application No. 12/215,553, filed on Jun. 27, 2008, now Pat. No. 7,552,905, which is a continuation of application No. 11/801,928, filed on May 11, 2007, now Pat. No. 7,407,147, which is a division of application No. 11/192,627, filed on Jul. 29, 2005, now Pat. No. 7,232,110, which is a division of application No. 11/004,704, filed on Dec. 3, 2004, (Continued)

(51) Int. Cl.
*E03D 3/06* (2006.01)
*E03D 5/10* (2006.01)
*F16K 31/385* (2006.01)
*F16K 31/40* (2006.01)

(52) U.S. Cl.
CPC ............... *E03D 3/06* (2013.01); *E03D 5/10* (2013.01); *F16K 31/3855* (2013.01); *F16K 31/404* (2013.01); *Y10T 137/0318* (2015.04); *Y10T 137/86389* (2015.04)

(58) Field of Classification Search
CPC ..... F16K 31/303; F16K 31/3855; E03D 3/06; E03D 5/10
USPC .......................... 137/624.11, 624.12, 624.13
See application file for complete search history.

(56) References Cited

U.S. PATENT DOCUMENTS 2,982,307 A * 5/1961 Mueller ................. F16K 31/48
137/624.15
5,680,879 A * 10/1997 Sheih ....................... E03D 3/06
137/240

(Continued)

*Primary Examiner* — Daphne M Barry
(74) *Attorney, Agent, or Firm* — Raymond Y. Chan; David and Raymond Patent Firm

(57) ABSTRACT

A method of controlling actuation of a flush apparatus includes the steps of configuring a control module to actuate the flush apparatus for completing a flushing cycle periodically; and after a given unused time period of the flush apparatus, enabling the control module to enter into a sleep mode to stop an actuation of the flush apparatus. Therefore, during the rush hours, the control module is configured to actuate the flush apparatus frequently and during the off rush hours, the control module is configured to actuate the flush apparatus seldom.

15 Claims, 13 Drawing Sheets

Related U.S. Application Data now Pat. No. 7,028,977, which is a division of application No. 10/640,693, filed on Aug. 14, 2003, now Pat. No. 6,845,961, which is a continuation-in-part of application No. 10/377,124, filed on Feb. 28, 2003, now Pat. No. 6,840,496.

(56) References Cited

U.S. PATENT DOCUMENTS

| | | | |
|---|---|---|---|
| 6,250,601 B1* | 6/2001 | Kolar et al. | 251/129.04 |
| 2003/0102449 A1* | 6/2003 | Parsons et al. | 251/129.04 |
| 2006/0006354 A1* | 1/2006 | Guler et al. | 251/129.04 |
| 2007/0030145 A1* | 2/2007 | Marcichow | E03C 1/057 |
| | | | 340/539.1 |

* cited by examiner

METHOD AND SYSTEM FOR CONTROLLING ACTUATION OF FLUSH APPARATUS

CROSS REFERENCE OF RELATED APPLICATION

This is a Continuation-In-Part application that claims the benefit of priority under 35 U.S.C. § 119 to a non-provisional application having an application Ser. No. 13/506,643 and a filing date of May 3, 2012, which is a Divisional application having an application Ser. No. 12/927,334 and a filing date Nov. 12, 2010, which is a Continuation application having an application Ser. No. 12/460,341 and a filing date of Jul. 16, 2009, which is a Continuation application that claims the benefit of priority under 35 U.S.C. § 119 to a non-provisional application having an application Ser. No. 12/454,775 and a filing date May 21, 2009, which is a Continuation application of a non-provisional application having an application Ser. No. 12/215,553 and a filing date of Jun. 27, 2008, which is a Continuation application of a non-provisional application having an application Ser. No. 11/801,928 and a filing date of May 11, 2007, which is a divisional application of a non-provisional application, having an application Ser. No. 11/192,627 and a filing date of Jul. 29, 2005, which is a divisional application of a non-provisional application having an application Ser. No. 11/004,704 and a filing date of Dec. 3, 2004, which is a divisional application of a non-provisional application having an application Ser. No. 10/640,693 and a filing date Aug. 14, 2003, which is a Continuation-In-Part application of a non-provisional application having an application Ser. No. 10/377,124 and a filing date of Feb. 28, 2003.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an automatic flush actuation apparatus which is capable of incorporating with a conventional manual system, such as urinal and water closet, so as to selectively operate the automatic flush actuation apparatus automatically through the use of a sensor or normally through an actuation lever.

Description of Related Arts

Manual operated toilet room flush valves for use on urinals and water closets in public restrooms are well known. As shown in FIG. 1, a conventional manual operated automatic flush actuation apparatus comprises a valve body A1 having a water inlet A11 and a water outlet A12, a diaphragm A2 having a water channel A21 communicating between the water inlet A11 and the water outlet A12, a relief valve A3 disposed at the diaphragm A2 for blocking the water flowing from the water inlet A11 to the water outlet A12 through the water channel A21, and a flush lever A4 arranged to move the relief valve A3 at a position that the water is allowed to flow to the water outlet A12 for completing the flushing operation.

For hygiene purposes, an automatic operated toilet room flush valve is developed. For example, U.S. Pat. Nos. 5,169,118 and 5,244,179 disclose a solenoid operated automatic flush valve which is battery-operated and utilizes a latching solenoid to limit power drain on the battery. Accordingly, when the infrared sensor detects the presence of a user of a urinal or toilet, the flush valve is automatically driven to open to complete the flushing operation. However, the flush valves, according to the above patents, have several common drawbacks.

The presence of the user sensed by the infrared sensor will cause the solenoid to move the diaphragm to a valve open position. It is known that the solenoid is made of a number of circular wire loops to generate a magnetic force when an electric current is passed through the wire loops. The solenoid may come in contact with water such that the solenoid may accumulate rusting particles from the water, which may remain on the solenoid. It is one of the common problems to cause a failure of operation of the flush valve. In other words, the conventional manual operated flush valve is more reliable than the solenoid operated automatic flush valve. Thus, the maintenance cost of the solenoid operated automatic flush valve is higher than that of the conventional manual operated flush valve.

In addition, the structural design of the solenoid operated automatic flush valve is different from that of the manual operated flush valve. In other words, when the flushing system is incorporated with the solenoid operated automatic flush valve, the flushing system will lose the mechanical-manual operated feature. Therefore, there is no alternative to operate the flushing cycle when the solenoid operated automatic flush valve has failed to operate.

In order to install the solenoid operated automatic flush valve into the conventional flushing system, the mechanical-manual operating mechanism of the flush valve must be totally removed, which is a waste of resources in order to incorporated with the solenoid operated automatic flush valve.

The configuration of the solenoid operated automatic flush valve is complicated, wherein once the solenoid is broken or the battery is dead, the facility should call a technician to open an outer cover and disassemble an inner cover for the replacement of the solenoid or the battery. Due to the complicated structure of the solenoid operated automatic flush valve, the solenoid operated automatic flush valve requires a skilled technician to replace the broken solenoid and/or even replace the battery, which may further increase the maintenance cost of the infrared operated automatic flush valve.

Furthermore, since the flushing cycle of the automatic flush valve is activated by the presence of the user, it is wasteful of water when the public restroom is often in use. Most of the public places, such as concert hall or sport stadium, during the rush hours, people will line up in the restroom. The automatic flush valve will activated for every ten seconds to start the flushing cycle. In other words, after the previous user uses the urinal, the subsequent user has to wait until the flushing cycle is completed.

Most of the automatic flush valves cannot adjust each configurations of the flushing cycle to meet the specific requirements. For example, during the baseball game, the toilets in public facility in a baseball stadium need a relatively larger volume of flushing water to keep the toilet empty and clean due to the frequently use of the toilets. Take the restroom in the restaurant for another instance. During the non rush hours, such as in the afternoon, the restaurant may only need smaller amount of flushing water since fewer customers in this period, so as to prevent wasting flushing water.

Therefore, there exists a great need for controlling each of the flushing cycles of the automatic toilet to meet the different requirements and situations of using the automatic toilet.

SUMMARY OF THE PRESENT INVENTION

A main object of the present invention is to provide an automatic flush actuation apparatus, which has a control panel electrically and operatively linked to a CPU of the flush apparatus, so that a flushing cycle is self-started every predetermined time interval that is adjustably controlled in a timely manner via the control panel.

Another object of the present invention is to provide an automatic flush actuation apparatus, wherein the control panel is adapted for adjustably selecting the predetermined time intervals of self-starting the flushing cycle, such that an operator, such as a cleaner of the toilet, is able to selectively adjust the time intervals according to variety of circumstances.

Another object of the present invention is to provide an automatic flush actuation apparatus, which is able be remotely controlled for selecting the flushing configurations.

Another object of the present invention is to provide an automatic flush actuation apparatus, which comprises a central CPU electrically and operatively linking to two or more CPU of each of the flush apparatus, so that central CPU is able to concurrently and automatically control a group of the flush apparatus, so as to conveniently and selectively switch the flushing configurations.

Another object of the present invention is to provide an automatic flush actuation apparatus which is capable of incorporating with a conventional manual flushing system, such as urinal and water closet, so as to automatically operate the flush valve through the use of a sensor.

Another object of the present invention is to provide an automatic flush actuation apparatus without altering the original structural design of the manual operated flush valve in order to incorporate with the present invention. Therefore, the user is able to mechanically-manually operate the flushing cycle for the flushing system if the automatic operation system is not functioning properly.

Another object of the present invention is to provide an automatic flush actuation apparatus which is reliable and that can be easily installed and maintained.

Another object of the present invention is to provide an automatic flush actuation apparatus, wherein a covering cap has a battery opening that allows a power source exposing to outside. Therefore, any individual is able to simply replace the power source without detaching the covering cap from the flushing system, so as to reduce the maintenance cost of the present invention.

Another object of the present invention is to provide an automatic flush actuation apparatus, wherein the covering cap further has a sensor opening that allows a CPU exposing to outside. Therefore, any individual is able to make adjustments via the sensor switch through the CPU opening without detaching the covering cap from the flushing system.

Another object of the present invention is to provide an automatic flush actuation apparatus, which is powered by an electric motor so as to avoid water damage and to enhance performance and reliability.

Another object of the present invention is to provide an automatic flush actuation apparatus, which provides an economic and efficient solution for incorporating with the conventional manual operated flushing system in a simple and economical way.

Additional advantages and features of the invention will become apparent from the description which follows, and may be realized by means of the instrumentalities and combinations particular point out in the appended claims.

Accordingly, in order to accomplish the above objects, the present invention provides an automatic flush actuation apparatus for a flushing system which comprises a valve body having a water inlet, a water outlet and a water chamber communicating therebetween, a valve seat, having a flush channel, normally sealed with the water chamber and disposed between the water inlet and the water outlet for retaining a predetermined water pressure within the water chamber so as to block water flowing from the water inlet to the water outlet, and a flush lever coupled with the valve body, wherein the flush valve comprises:

a valve member adapted for being disposed at the valve seat to control the water flowing from the water inlet to the water outlet, wherein the valve member is capable of being moved by the flush lever between a manual-operated closed position and a manual-operated opened position, wherein at the manual-operated closed position, the valve member is arranged for sealedly sitting at the valve seat to block the water from passing through the water outlet, and at the manual-operated opened position, the valve member is moved to an opened position for releasing the water pressure within the water chamber to allow the water to pass from the water inlet to the water outlet through the water chamber; and a sensor-operated powering assembly, comprising:

a housing, which is adapted for mounting on the valve body; a replaceable power source received in the housing; a CPU electrically connected with the power source for sensing a presence of a user of the flushing system, so as to active the power generator; a power generator electrically connected to the CPU; a relief valve provided at the valve member for controlling the water flowing from the water inlet to the water outlet through the water chamber; and an actuator driven by the power generator to move the relief valve between an auto-operated closed position and an auto-operated opened position, wherein at the auto-operated closed position, the relief valve is sealedly closed for blocking the water passing to the water outlet, and at the auto-operated opened position, the relief valve is moved to an opened position by the actuator for releasing the water pressure within the water chamber to allow the water passing to the water outlet.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
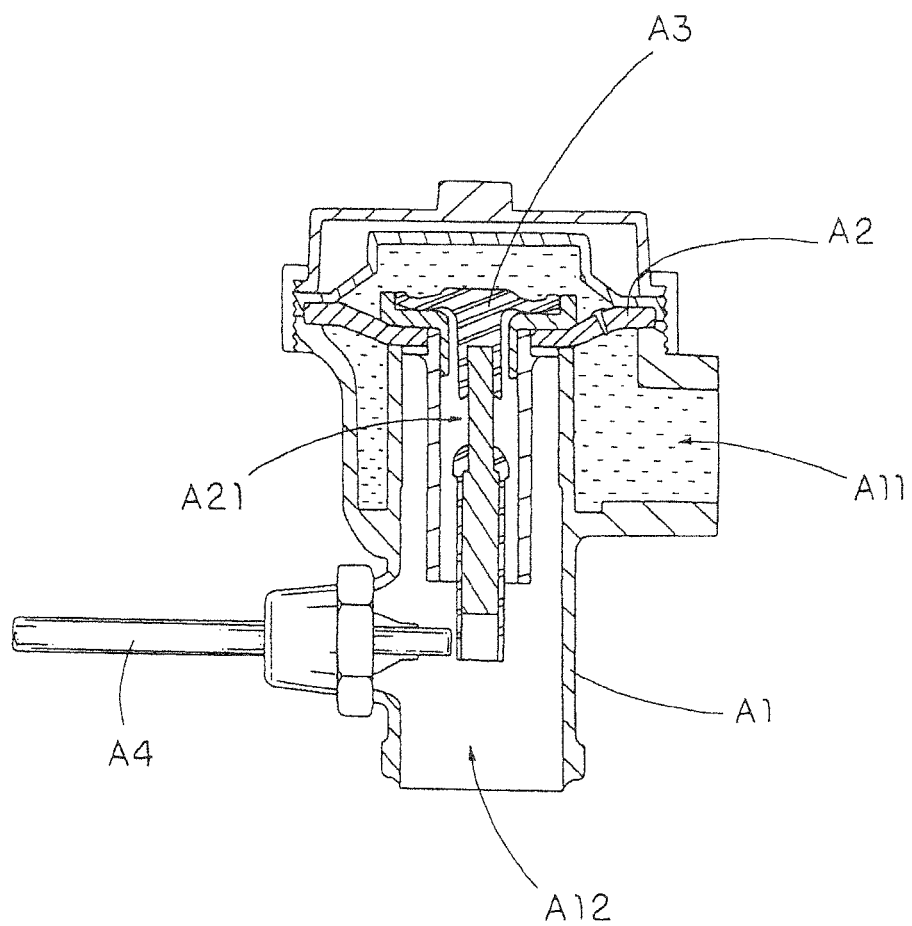
FIG. 1 is a sectional view of a conventional manual operated flushing system.
Figure 2:
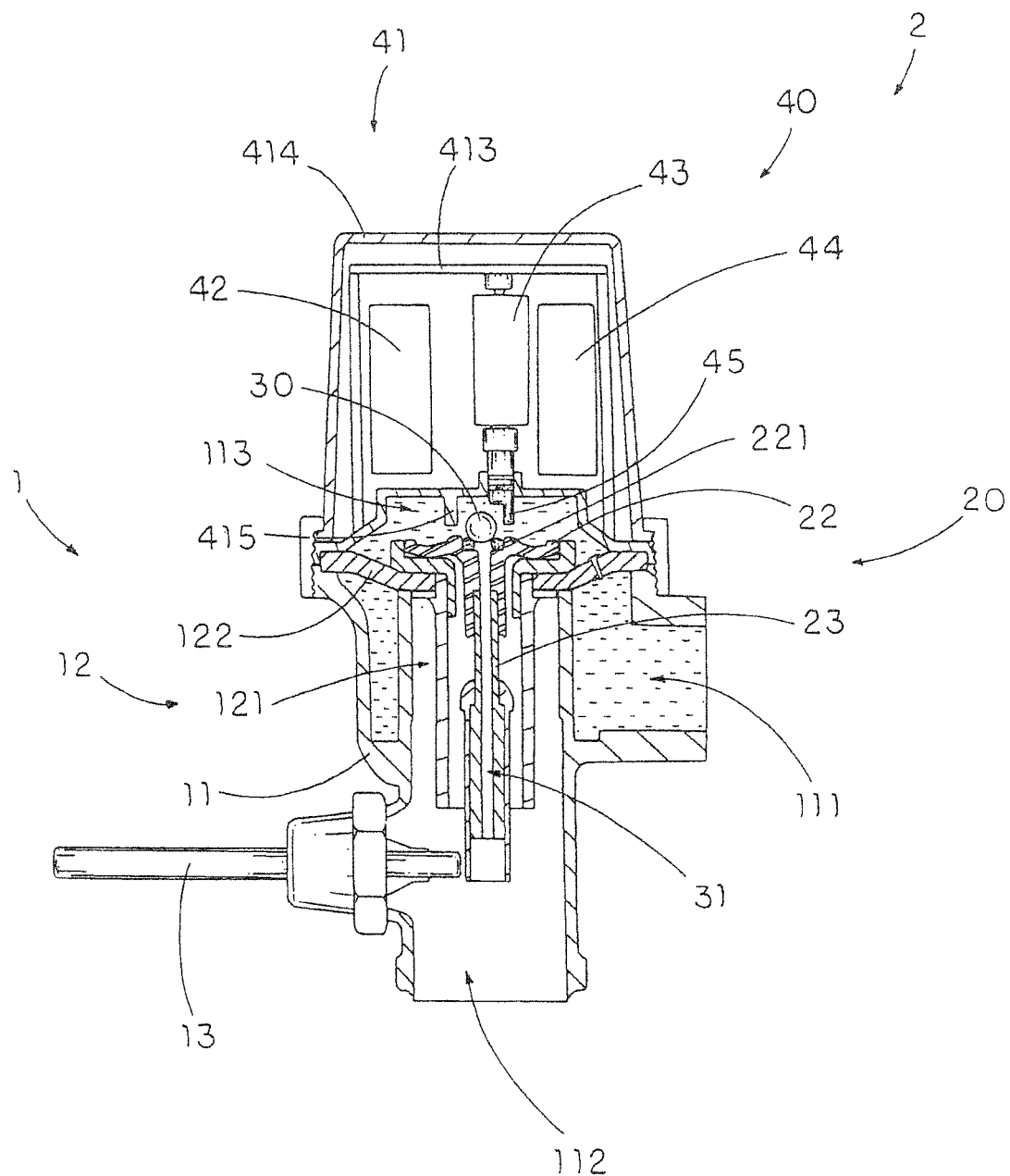
FIG. 2 is a sectional view of an automatic flush actuation apparatus according to a preferred embodiment of the present invention.

Referring to FIG. 2 of the drawings, an automatic flush actuation apparatus 2 for a flushing system 1 according to a preferred embodiment of the present invention is illustrated, wherein the automatic flush actuation apparatus 2 is capable of incorporating with a conventional manual operated fluid flow system such as a flushing system to achieve both manual and automatic operations to start a flushing cycle of the flushing system 1.

The flushing system 1, such as the conventional manual operated flushing system, comprises a valve body 11 having a water inlet 111, a water outlet 112 and a water chamber 113 that is normally sealed between the water inlet 111 and the water outlet 112, a valve seat 12, having a flush channel 121, disposed between the water inlet 111 and the water outlet 112 to block water flowing from the water inlet 111 to the water outlet 112, and a flush lever 13 coupled with the valve body 11.

The valve seat 12 comprises a diaphragm 122, having a bleed hole 100, sealedly disposed in the valve body 11 in a movable manner to define the water chamber 113 above the diaphragm 122 to communicate between the water inlet 111 and the water outlet 112. In other words, once the water within the water chamber 113 is released to reduce the water pressure therein, the diaphragm 122 is forced to bend upwardly so that the water is capable of passing from the water inlet 111 to the water outlet 112 to complete the flushing cycle of the flushing system.

Accordingly, the water is flowed into the water chamber 113 from the water inlet 111 through the bleed hole 100 on the diaphragm 122 in such a manner that the water within the water chamber 113 provides a predetermined water pressure against the diaphragm 122 to normally block the water flowing to the water outlet 112.

The automatic flush actuation apparatus 2 comprises a valve member 20 and a sensor-operated powering assembly 40.

The valve member 20 is adapted for being disposed at the valve seat 12 to control the water flowing from the water inlet 111 to the water outlet 112. The valve member 20 is capable of being moved by the flush lever 13 between a manual-operated closed position and a manual-operated opened position, wherein at the manual-operated closed position, the valve member 20 is arranged for sealedly sitting at the valve seat 12 to block the water passing to the water outlet 112, and at the manual-operated opened position, the valve member 20 is moved to an opened position for releasing the water pressure within the water chamber 113 through the flush channel 121 so as to allow the water passing from the water inlet 111 to the water outlet 112.

Figure 5:
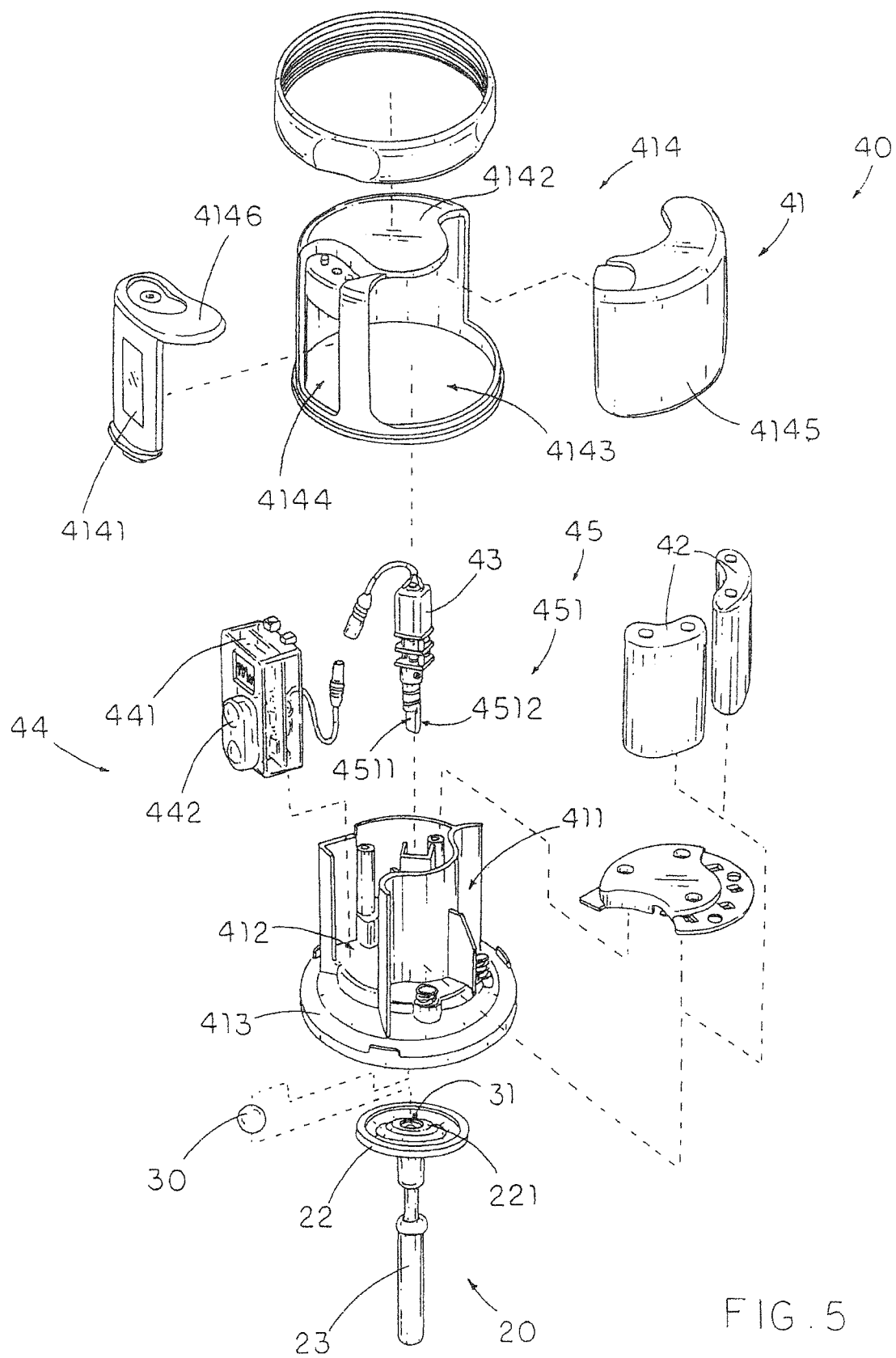
FIG. 5 is an exploded perspective view of a sensor-operated powering device of the automatic flush actuation apparatus according to the above preferred embodiment of the present invention.

As shown in FIGS. 2 and 5, the sensor-operated powering assembly 40 comprises a housing 41, which is adapted for mounting on the valve body 11, having a power source compartment 411 and a CPU cavity 412, a power source 42 replaceably received in the power source compartment 411, a power generator 43 electrically connected to the CPU 44, and the CPU 44 which is received in the CPU cavity 412 of the housing 41, electrically connected with the power source 42 for sensing a presence of a user of the flushing system 1, so as to active the power generator 43.

The sensor-operated powering assembly 40 further comprises a relief valve 30 provided at the valve member 20 for controlling the water flowing from the water inlet 111 to the water outlet 112 through the water chamber 113 and an actuator 45 driven by the power generator 43 to move the relief valve 30 between an auto-operated closed position and an auto-operated opened position.

Accordingly, at the auto-operated closed position, the relief valve 30 is sealedly closed for blocking the water passing to the water outlet 112, and at the auto-operated opened position, the relief valve 30 is moved to an opened position by the actuator 45 for releasing the water pressure within the water chamber 113 to allow the water passing to the water outlet 112.

According to the preferred embodiment, the valve member 20 comprises a sealing platform 22 arranged for sealedly supporting on the diaphragm 122 of the valve seat 12 to normally close the flush channel 121 and a valve controlling shaft 23 downwardly extended from the sealing platform 22 for communicating with the flush lever 13 within the flush channel 121.

Figure 3A:
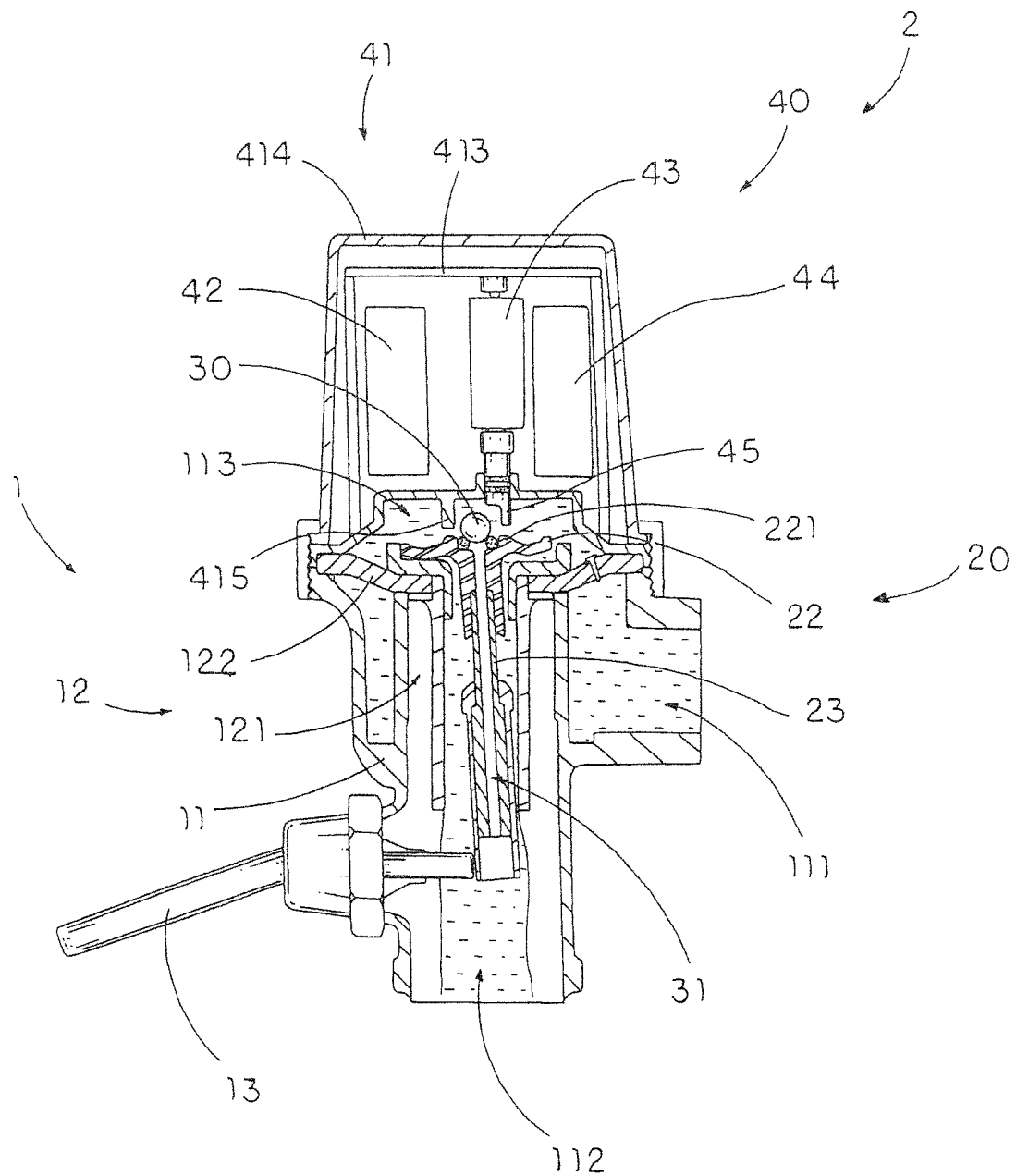
FIGS. 3A and 3B illustrate a manual operation of the flushing cycle for the automatic flush actuation apparatus according to the above preferred embodiment of the present invention.
Figure 3B:
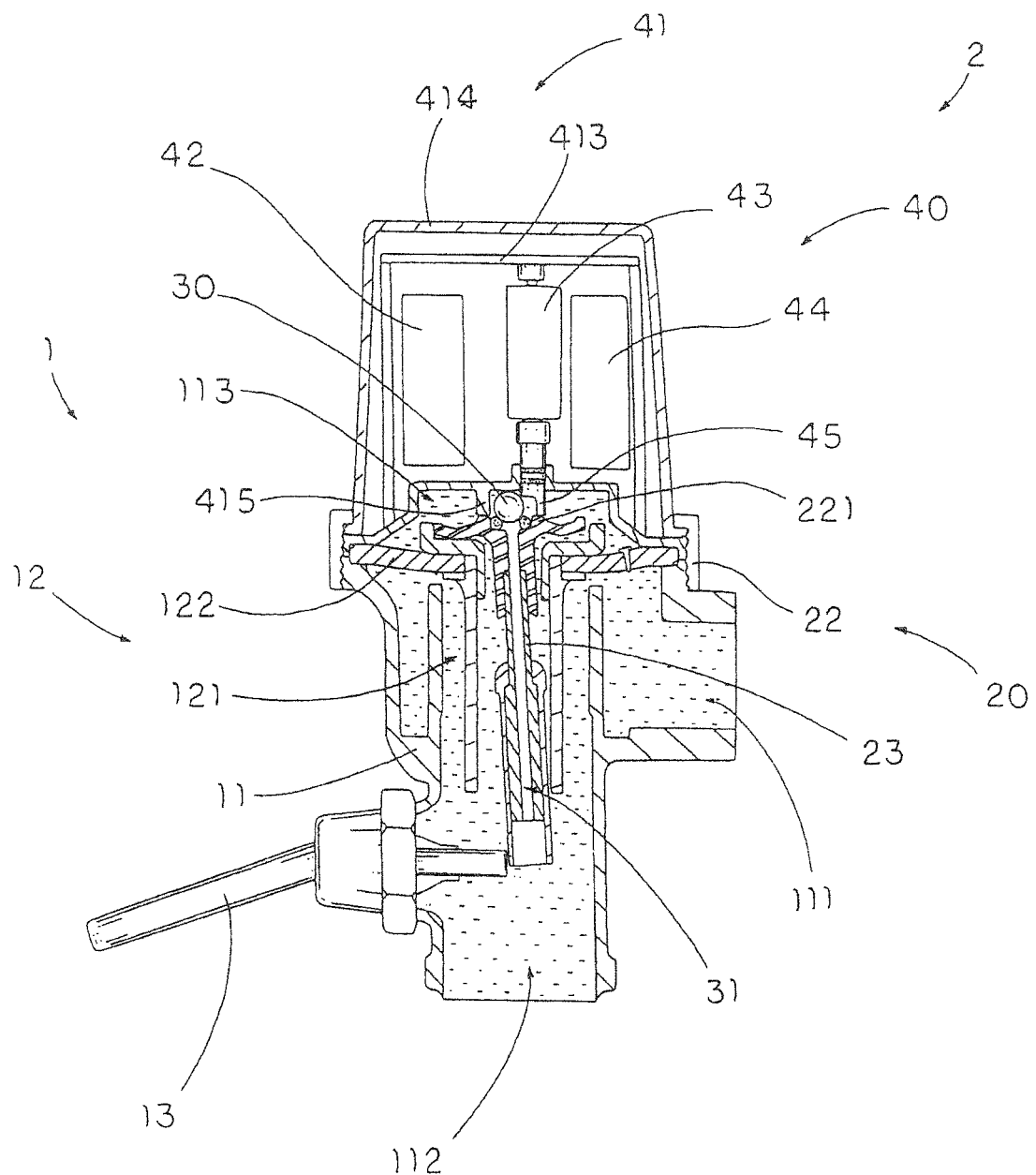

As shown in FIG. 3A, by actuating the flush lever 13, the valve controlling shaft 23 is pushed to drive the sealing platform 22 at a position offset with respect to the diaphragm 122 such that the water within the water chamber 113 is allowed to flow out through the flush channel 121 and release the water pressure within the water chamber 113 because the amount of water flowing out through the flush channel 121 is much larger than the amount of water flowing in through the bleed hole 100. Thus, when the water pressure within the water chamber 113 reduces, the diaphragm 122 is pushed upwardly for allowing the water passing to the water outlet 112, so as to start the flushing cycle of the flushing system 1 manually as the conventional manual-operated flushing system, as shown in FIG. 3B.

Once the flush lever 13 is returned back to its original position, the sealing platform 22 is forced to sealedly sit on the diaphragm 122 due to the water pressure so as to sealedly close the flush channel 121. Therefore, the diaphragm 122 is dropped down by refilling the water back into the water chamber 113 to increase the water pressure therein so as to sealedly close the water outlet 112 to stop the water passing thereto. It is worth to mention that since the sealing platform 22 is normally sealed on the diaphragm 122, no water is allowed to flow through the flush channel 121 to the water outlet 112 until the flushing cycle is started.

The relief valve 30 has a water passage 31 axially extended along the valve member 20 for communicating the water chamber 113 with the water outlet 112, and a valve stopper 32 disposed on the valve member 20 to normally close the water passage 31 for controlling the water flowing from the water inlet 111 to the water outlet 112.

As shown in FIG. 2, the water passage 31 is coaxially extended from the sealing platform 22 to a bottom end of the valve controlling shaft 23 for communicating the water chamber 113 with the water outlet 112.

The valve stopper 32, having a ball-shape, sits on the sealing platform 22 at an opening of the water passage 31 to normally close the water passage 31 for blocking the water pressure releasing from the water chamber 113. Accordingly, the sealing platform 22 has a circular retaining seat 221 protruding upwardly around the opening of the water passage 31 wherein the valve stopper 32 is disposed at the retaining seat 221 of the valve member 20 so as to hold the valve stopper 32 in position. It is worth to mention that when the valve member 20 is moved between the manual-operated closed position and the manual-operated opened position, the valve stopper 32 remains at the opening of the water passage 31 to block the water passing the water outlet 112.

As shown in FIG. 5, the housing 41 comprises a supporting frame 413 supported above the valve stopper 32 and a valve cap 414, having a transparent window 4141, adapted for detachably mounting on the valve body 11 to protectively enclose the supporting frame 413, wherein the power source 42, the power generator 43, and the CPU 44 are supported by the supporting frame 413 and enclosed by the valve cap 414 while the CPU 44 is capable of communicating with outside through the transparent window 4141.

According to the preferred embodiment, the power source 42 comprises a battery replaceably disposed in the power source compartment 411 to electrically connect with the CPU 44. It is worth to mention that the power source 42 can be used as an AC current to electrically plug into an electric outlet for supplying electricity to the CPU 44.

The power generator 43, according to the preferred embodiment, is an electric motor electrically connected to the CPU 44 wherein the power generator 43 is actuated via the CPU 44 to drive the actuator 45 to rotate. Accordingly, the power generator 43 can be a conventional solenoid electrically connected to the CPU 44 to drive the actuator 45 so as to move the valve stopper 32 between the auto-operated closed position and the auto-operated opened position. It is worth to mention that the electric motor is more reliable than the solenoid because the electric motor provides simple mechanical work rather than using the magnetic force, so as to minimize the failure operation of the power generator 43 and to reduce the maintenance cost of the present invention.

The CPU 44 comprises a control processor 441 supported in the housing 41 and a sensor 442 which is electrically connected to the control processor 441 and aligned with the transparent window 4141 of the valve cap 414. Accordingly, the sensor 442 is an infrared sensor arranged to detect the presence of the user by means of infrared signal in such a manner that when the sensor 442 sends an infrared signal through the transparent window 4141 for detecting the presence of the user of the flushing system, the control processor 441 activates the power generator 43 to actuate valve stopper 32 to open the relief valve 30.

In addition, the control processor 441 is a control circuitry to control the configuration of the flushing cycle wherein the control processor 441 is adapted to control the time of the flushing cycle, the water volume for each flushing cycle, the detecting range of the sensor 442, and the motion of the electric motor of the power generator 43. Thus, a default configuration is preset in the control processor 441 such that the automatic flush actuation apparatus of the present invention is capable of returning to its original settings through the control processor 441. It is worth to mention that the control processor 441 also controls the power of the power source 42 wherein when there is no sufficient power to actuate the power generator 43, the control processor 441 will control the relief valve 30 to remain in the closed position. In other words, only the manual operation of the flush lever 13 is capable of starting the flushing cycle when the control processor 441 stops the actuation of the relief valve 30.

The actuator 45 is rotatably extended from the power generator 43 wherein the actuator 45 has a driving end portion 451 downwardly and rotatably extended from a bottom side of the supporting frame 413 to contact with the valve stopper 32. Accordingly, the driving end portion 451 of the actuator 45, having a semi-circular cross section, has a flat contacting surface 4511 and a curved contacting surface 4512, wherein the driving end portion 451 of the actuator 45 is arranged to be driven to rotate via the power generator 43 to move the valve stopper 32 at the auto-operated closed position that the valve stopper 32 is contacted with the flat contacting surface 4511 of the actuator 45 to retain the valve stopper 32 at the opening of the water passage 31 for blocking the water passing to the water outlet 112 as shown in FIG. 2, and to move the valve stopper 32 at the auto-operated opened position that the valve stopper 32 is contacted with the curved contacting surface 4512 of the actuator 45 to move the valve stopper 32 to offset the opening of the water passage 31 for allowing the water passing to the water outlet, as shown in FIG. 4A.

Figure 4A:
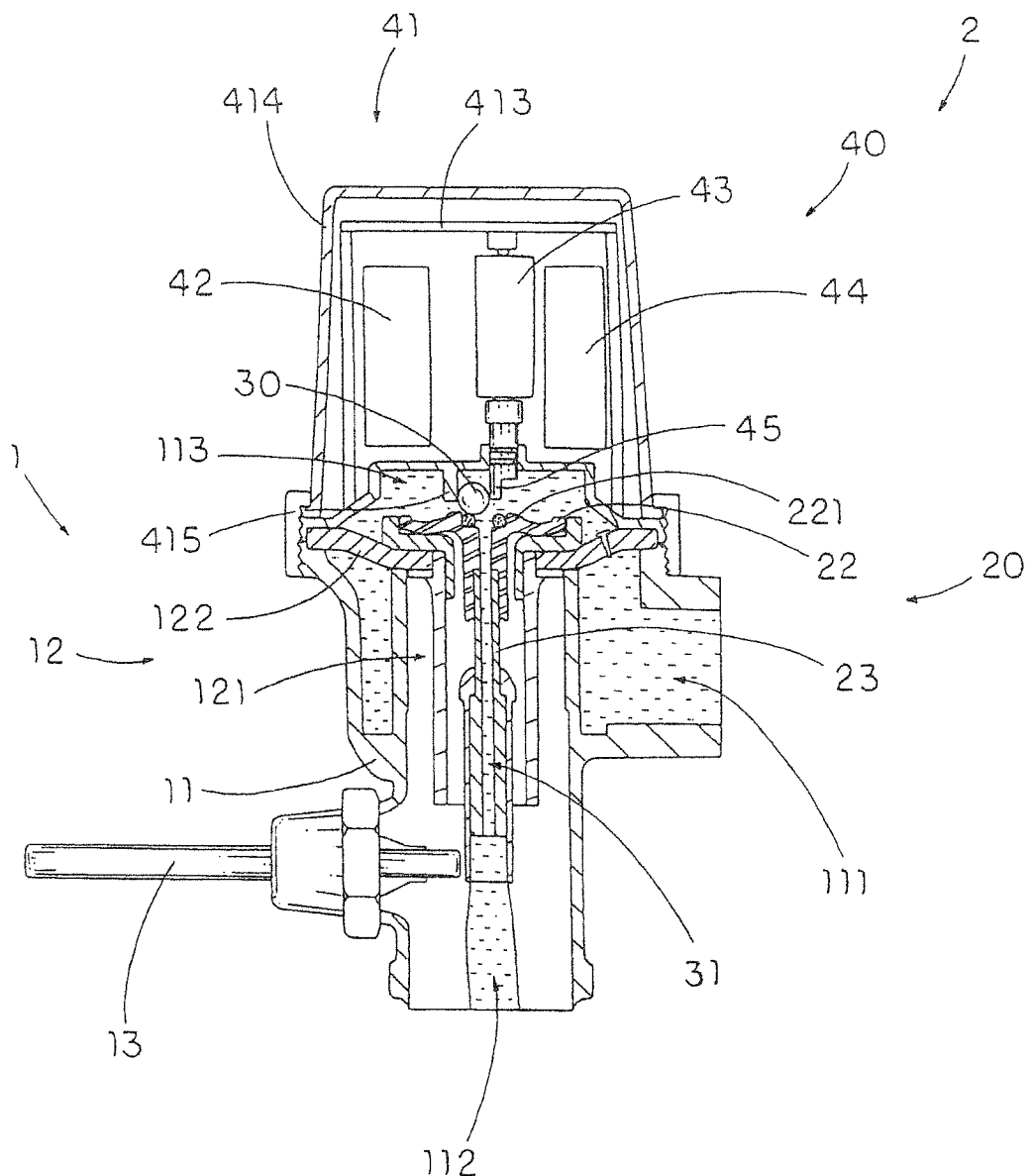
FIGS. 4A and 4B illustrate an automatic sensor operation of the flushing cycle for the automatic flush actuation apparatus according to the above preferred embodiment of the present invention.
Figure 4B:
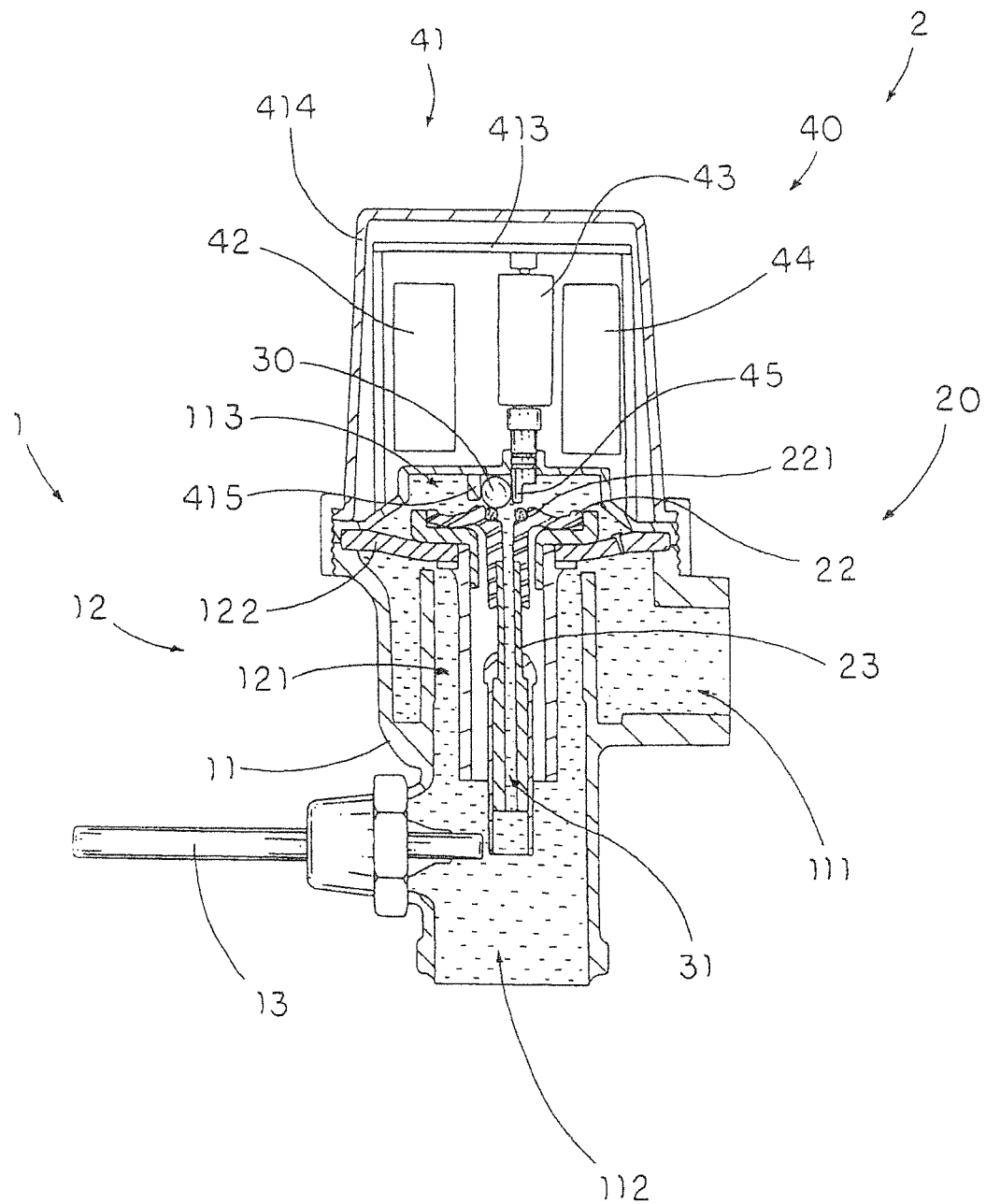

It is worth to mention that when the actuator 45 moves the valve stopper 32 away from the opening of the water passage 31, the water within the water chamber 113 is allowed to flow out through the water passage 31 so as to reduce the water pressure within the water chamber 113, as shown in FIG. 4A. Then, the diaphragm 122 is pushed upwardly for allowing the water flowing from the water inlet 111 to the water outlet 112, as shown in FIG. 4B. Once the valve stopper 32 is moved back into its original position to close the water passage 31, the diaphragm 122 is dropped down by refilling the water back into the water chamber 113 to increase the water pressure therein so as to sealedly close the water outlet 112 to stop the water passing thereto.

The sensor-operated flushing cycle of the flushing system 1 is controlled by the rotation of the actuator 45. Once the driving end portion 451 of the actuator 45 is rotated back to its original position, i.e. valve stopper 32 is contacted with the flat contacting surface 4511 of the actuator 45, the valve stopper 32 is forced to sealedly sit on the valve member 20 by means of water pressure to close the water passage 31. Therefore, the diaphragm 122 is dropped down by pressure to sealedly close the water outlet 112 to stop the water passing thereto.

It is worth to mention that the volume of water used in one flushing cycle for the flushing system 1 can be controlled by the power generator 43 through the CPU 44 to control the rotational speed of the actuator 45. The volume of water used in each flushing cycle can be adjustably controlled by controlling the rotational cycle of the actuator 45, i.e. how long the actuator 45 drives the valve stopper 32 to stay in the opened position and the closed position. In other words, the water volume of each flushing cycle will be increased when the CPU 44 delays the rotational cycling time of the actuator 45.

Accordingly, when the valve stopper 32 is moved between the auto-operated closed position and the auto-operated opened position, the valve member 20 is remained at its manual-operated closed position. Since the manual operation and the sensor operation employ with different water pathways, i.e. the flush channel 121 and the water passage 31, the manual and sensor operations do not interrupt with each other and function individually.

Therefore, to start the flushing cycle of the flushing system, the individual is able to either manually operate the flush lever 13 to move the valve member 20 to an offset position so as to release the water pressure through the flush channel 121 or automatically operate the CPU 44 to move the valve stopper 32 to an offset position so that the water pressure is allowed to be released through the water passage 31. In other words, even though the sensor-operated powering assembly 40 fails to operate due to the battery, the individual is still able to complete the flushing cycle for the flushing system manually.

In order to securely hold the valve stopper 32 in position, the supporting frame 413 of the housing 41 further comprises a locating ring 415 integrally and downwardly protruded from the bottom side of the supporting frame 413 to coaxially align with the water passage 31 so as to form as a boundary for the valve stopper 32 to move within the locating ring 415. In other words, the locating ring 415 limits the movement of the valve stopper 32 to prevent the valve stopper 32 from becoming dislocated on the valve member 20 and to guide the valve stopper 32 returning back to the opening of the water passage 31 after completing the flushing cycle.

As shown in FIG. 5, the valve cap 414 further comprises an outer casing 4142 having a power source opening 4143 aligned with the power source compartment 411 to expose the power source 42 to outside through the power source opening 4143 and a CPU opening 4144 aligned with the CPU cavity 412 to expose the CPU 44 to outside through the CPU opening 4144, and a power source cover 4145 detachably mounted on the outer casing 4142 to cover the power source opening 4143, wherein the transparent window 4141 is detachably mounted on the outer casing 4142 to enclose the CPU 44 within the valve cap 414.

Therefore, an individual is able to replace the power source 42 and to adjust the settings of the CPU 44 by detaching the power source cover 4145 and the transparent window 4141 respectively without removing the entire valve cap 414 so as to simplify the replacement operation and adjustment of the present invention. It is worth to mention the valve cap 414, such as the conventional cap, is securely mounted on the valve body 11 via a locking ring 400 such that the individual must use a wrench to unscrew the locking ring 400 in order to detach the valve cap 414. It is worth to mention that the locking ring 400 is arranged to sealedly mount the diaphragm 122 of the valve seat 12 on the valve body 11 to prevent water leakage thereof. However, it would be inconvenient to replace the power source 42 and to adjust the CPU 44 if the valve cap 414 must be detached from the valve body 11 and then sealedly attached back onto the valve body 11. Thus, the water may leak to the outside when the valve cap 414 is opened, especially if the valve cap 414 is not perfectly sealed onto the valve body 11.

In addition, the valve cap 414 further comprises a cover locker 4146 provided on the outer casing 4142 to securely lock up the power source cover 4145 and the transparent window 4141 to enclose the power source opening 4143 and the CPU opening 4144 respectively. It is worth to mention that the locking and unlocking operation of the cover locker 4146 is simply in comparison with the locking and unlocking operation of the valve cap 414, so as to provide a quick and easy replacement operation of the present invention.

In comparison with the conventional manual operated flushing system, the conventional manual operated flushing system can keep most of the major components, such as the valve body 11, valve seat 12 and the flush lever 13, in order to incorporate with the automatic flush actuation apparatus 2 of the present invention, so as to minimize the cost of incorporating the conventional manual operated flushing system with the automatic flush actuation apparatus 2 of the present invention.

Figure 6:
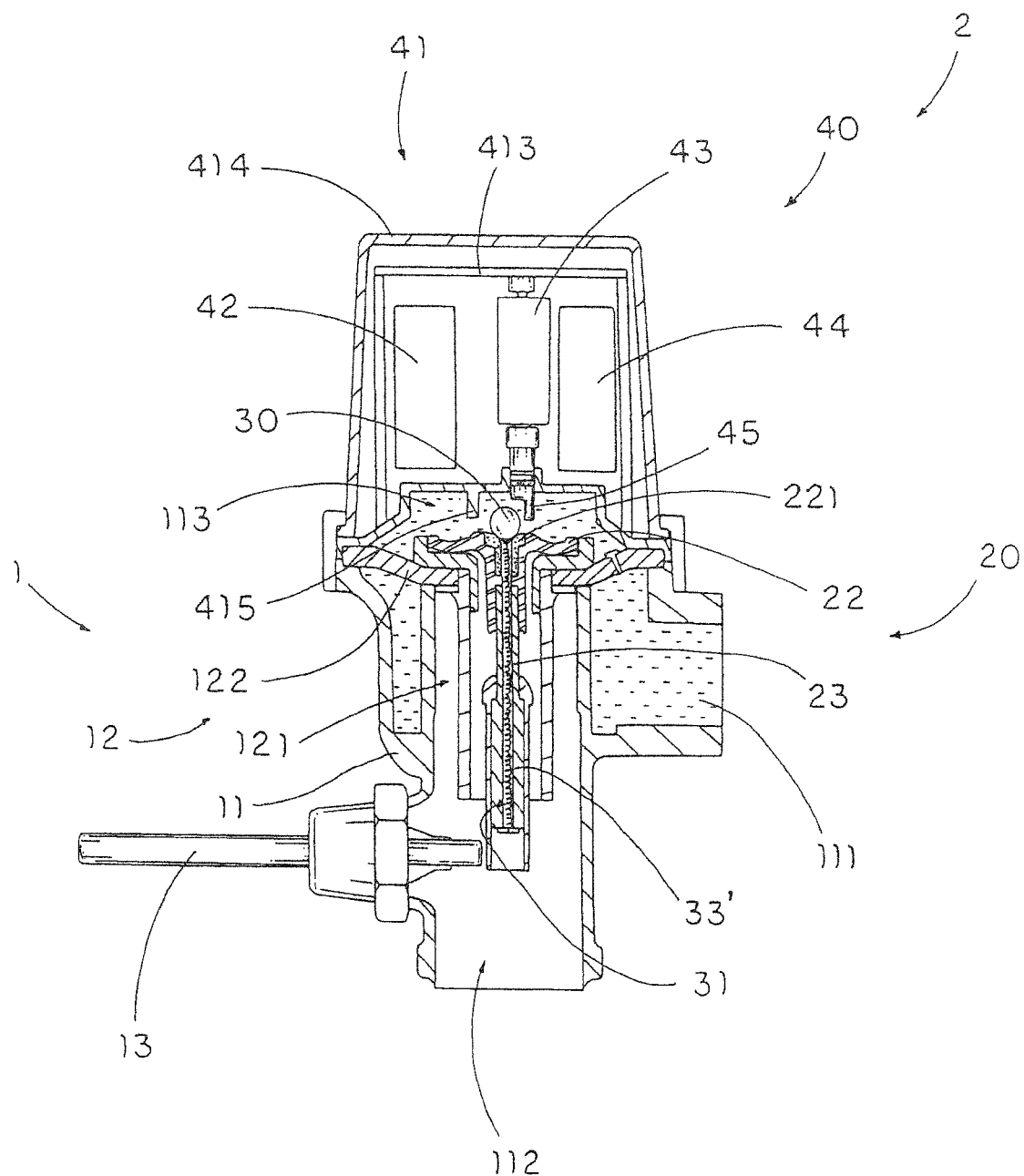
FIG. 6 illustrates an alternative mode of the relief valve of the automatic flush actuation apparatus according to the above preferred embodiment of the present invention.

FIG. 6 illustrates an alternative mode of the relief valve 30 wherein the relief valve 30 further comprises a resilient element 33' having a biasing end biasing against the valve stopper 32 so as to normally retain the valve stopper 32 at the auto-operated closed position. The resilient element 33', according to the preferred embodiment, is a compression spring disposed within the water passage 31 for applying an urging force against the valve stopper 32 so as to normally pull the valve stopper 32 to sealedly close the opening of the water passage 31. As shown in FIG. 6, the biasing end of the resilient element 33' coupled with the valve stopper 32 and an opposed affixing end coupled with a bottom end of the water passage 31 for applying the pulling force against the valve stopper 32.

Figure 7A:
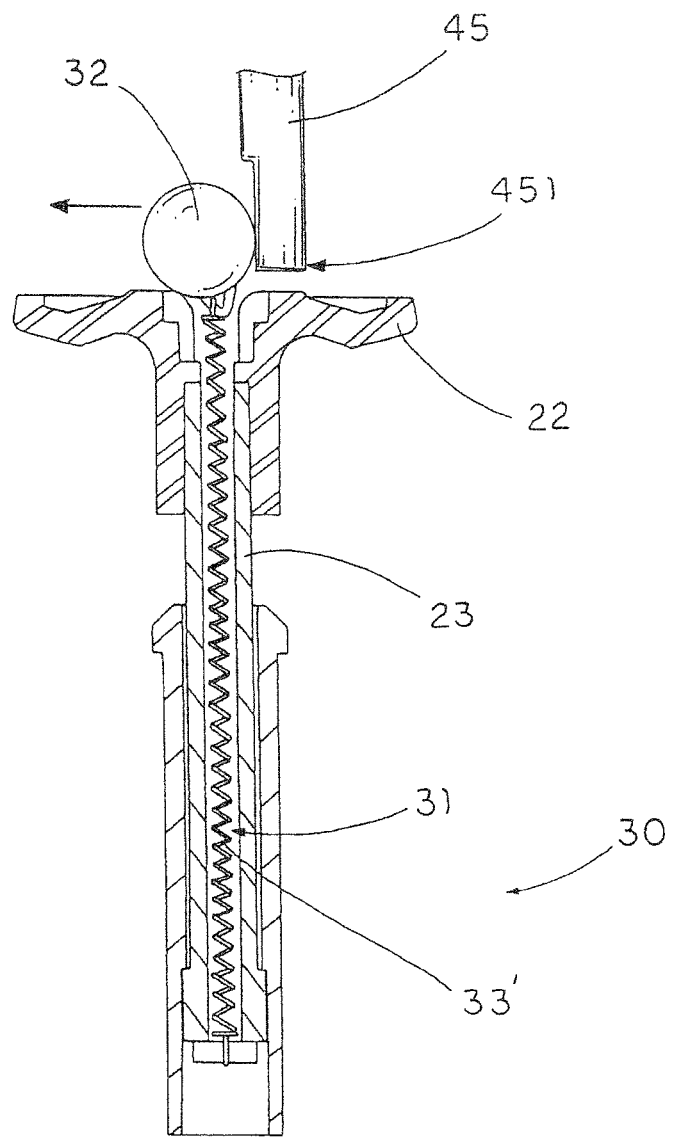
FIGS. 7A and 7B illustrate the operation of the relief valve of the alternative mode according to the above preferred embodiment of the present invention.
Figure 7B:
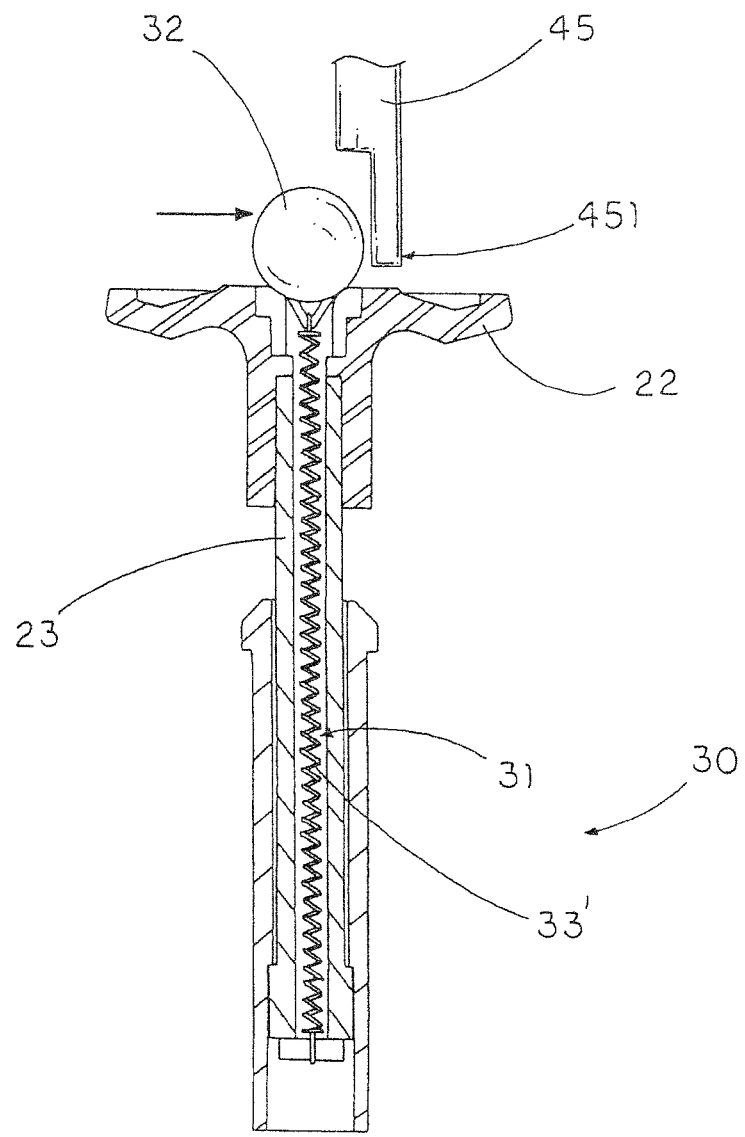

As shown in FIG. 7A, when the driving end portion 451 of the actuator 45 is driven to rotate to move the valve stopper 32 to the offset position so as to allow the water to flow through the water passage 31, the resilient element 33' is forced to stretch for applying the urging pressure against the valve stopper 32. After the driving end portion 451 of the actuator 45 moves back to its original position, the resilient element 33 rebounds to its original form to pull the valve stopper 32 back on the retaining seat 221 of the sealing platform 22 for sealing the water passage 31 so as to block the water to flow therethrough, as shown in FIG. 7B. Therefore, the resilient element 33' ensures the valve stopper 32 of the relief valve 30 returning back to the auto-operated closed position after each flushing operating.

In addition, the automatic flush actuation apparatus 2 of the present invention is capable of incorporating with most conventional flushing systems to provide the sensor operation of the flushing system with or without the flush lever 13 for starting the flushing cycle. It is worth to mention that the valve member 20 can be embodied as the valve seat 12 when the automatic flush actuation apparatus 2 of the present invention is incorporated with the conventional sensor-operation flushing system.

Figure 8:
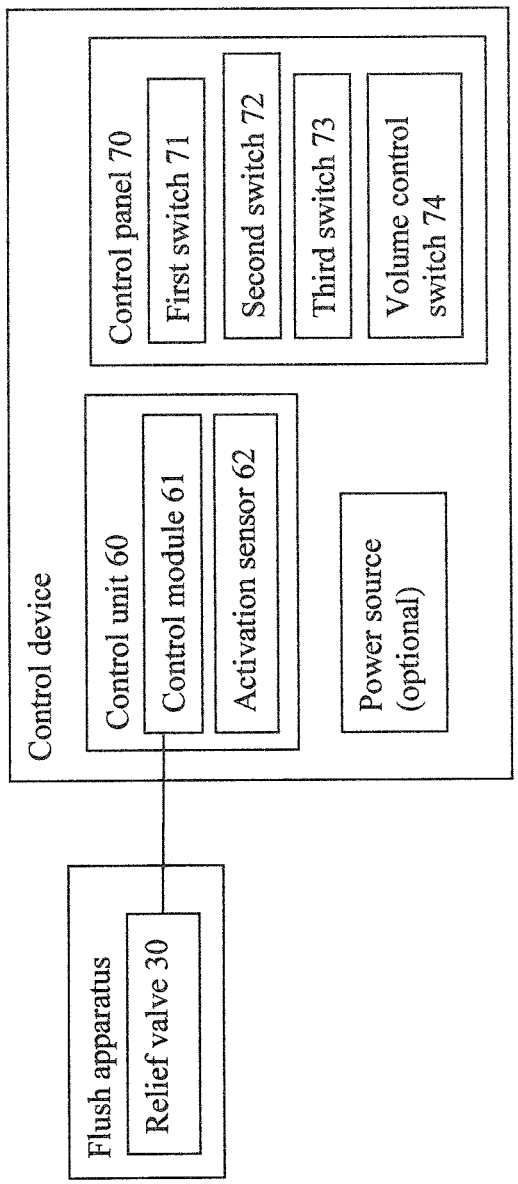
FIG. 8 is a block diagram illustrating the flush apparatus incorporating with a control device according to the above preferred embodiment of the present invention.

FIG. 8 illustrates a modification of the flush apparatus according to the above embodiment, wherein the flush apparatus for the flushing system, such as urinals or toilets, will be selectively actuated by the presence of the user and by a preset time periodically. Accordingly, the flush apparatus further comprises a control device for actuating the relief valve 30 in a timely manner. The control device is a fully programmable automatic flush control device for urinals and toilets that the control device converts most flushing systems into water efficient fixtures by controlling the amount of daily flushes. The flush intervals can be programmed to flush once every 1, 2, 4, 6, 8, 12, or 24 hours as an example.

The control device comprises a control unit 60 electrically and operatively linking to the relief valve 30 and a control panel 70 electrically linking to the control unit 60. For each flushing cycle, the relief valve 30 is driven to move to the opened position for allowing water passing to the water outlet 112 from a normally closed position for blocking water passing to the water outlet 112 according to an electric signal sent via the control unit 60.

Accordingly, the control unit 60 comprises a programmable control module 61 selectively set between a normal flush mode and a timer flush mode. The normal flush mode is that the relief valve 30 is actuated to start the flushing cycle by means of the presence of the user of the flushing system via the sensor 442 as it is mentioned above. The timer flush mode is that the relief valve 30 is actuated to start the flushing cycle periodically.

Thus, the control panel 70 is adapted for adjustably and selectively controlling a flushing configuration of the flush apparatus 2 via the control unit 60. One of the flushing configurations is embodied as a time interval for self-starting the flushing cycle of the flush apparatus. In other words, the flushing cycle of the flush apparatus will be automatically completed in a timely manner.

According to the preferred embodiment, the control module 61 of the control unit 60 is incorporated with the CPU 44 in such a manner that the control unit 60 is adapted to controllably activate the power assembly 40 to move the relief valve 30 between the opened position and the closed position.

In other words, the control panel 70 is adapted for adjustably selecting a time interval for automatically self-starting the flushing cycle, so that the flushing cycle is automatically started every predetermined time interval as set up in the control unit 60 via the control panel 70. Therefore, the control module 61 of the control unit 60 generates a signal to the relief valve 30 of the automatic flush actuation apparatus 2 every regular time interval, so as to allow the flushing water to pass through the relief valve 30 to start the flushing cycle every predetermined time interval. Therefore, the control unit 60 is controllably adjusting the relief valve 30 between the open position to allow flushing water pass from the water inlet 111 to water outlet 112 through the relief valve 30, and a normally close position to normally block the water flowing from the water inlet 111 to water outlet 112. When the control unit 60 generates a signal to the relief valve 30 at the opened position, the flushing water is passing through the relief valve 30 to complete the flushing cycle.

The control panel 70 can be a digital panel for selectively controlling the control unit 60 to manipulate the settings of time intervals of self-started flushing cycle of the flushing configurations. Alternatively, the control panel 70 can be an analogy panel which comprises a plurality of controlling switches for selectively controlling the control unit 60 to manipulate the settings of time intervals of self-started flushing cycle of the flushing configurations, wherein the controlling switches are actuated for selectively switching different time interval settings of the default step of automatically self-starting flushing cycles.

Preferably, the control panel 70 has three control switches 71, 72, 73 to program a flush program provided by the control module 61. The first control switch 71 is arranged to set between the normal flush mode and the timer flush mode. For example, when the first control switch 71 is toggled, the control unit 60 is switched from the normal flush mode to the timer flush mode. When the first control switch 71 is toggled again, the control unit 60 is switched back to the normal flush mode from the timer flush mode.

In the normal flush mode, the second control switch 72 is activated as a delay control, wherein each flushing cycle will be delayed at a predetermined time. For example, each flushing cycle will be delayed 3 seconds to flush the flushing system. In other words, the relief valve 30 will be 3-second delay to be actuated to start the flushing cycle after the user uses the flushing system. Especially for rush hours, after the previous user uses the flushing system, the subsequent user will not need to wait until the flushing cycle is completed.

In the normal flush mode, the third control switch 73 is activated as a "ghost" flush control that the relief valve 30 is automatically actuated at a predetermined time to flush the flushing system even though no one uses the flushing system. For example, the third control switch 73 is toggled to set for 24 hours, such that every 24 hours, the relief valve 30 is automatically actuated to flush the flushing system.

In the timer flush mode, the second and third control switches 72, 73 are activated as the timer control to set the time interval for flushing the flushing system. For example, the second and third control switches 72, 73 are minute setter and hour setter respectively such that the time interval can be set via the second and third control switches 72, 73. According to the preferred embodiment, the time interval can be preset to 10 minutes via the control panel 70, so that so that the flushing cycle automatically starts every 10 minutes for flushing the toilet. In other words, the relief valve 30 will be actuated for every 10 minutes. Likewise, the time interval can be preset to one hour, every two, four, six, twelve, or twenty four hours respectively via the control panel 70 for starting the flushing cycle, in such a manner that a manager, such as a cleaner of a public lavatory, is able to controllably select the time intervals of the flushing configuration regarding to variety circumstances, such as during rush hours and off rush hours. In other words, during the rush hours, the control module 61 is configured to actuate the flush apparatus frequently, and during the off rush hours, the control module 61 is configured to actuate the flush apparatus seldom.

In the timer flush mode, the control switches 71, 72, 73 can be set at a test mode for testing whether the installation of the control device to the flush apparatus is working or not. Under the test mode, the flushing cycle is automatically and immediately started to flush the flushing system preferably for 20 seconds.

The control panel 70 further has a volume control switch 74 for selectively controlling the control unit 60 to manipulate the settings of water volume of self-started flushing cycle of the flushing configuration. Accordingly, the volume control switch 74 can be switched between a high volume position and a low volume position. When the volume control switch 74 is set at the high volume position, the flushing cycle will automatically start at the predetermined time interval in responsive to the time configuration and will use a relatively high volume of water to complete the flushing cycle. Likewise, when the volume control switch 74 is set at the low volume position, the flushing cycle will automatically start at the predetermined time interval in responsive to the time configuration and will use a relatively low volume of water to complete the flushing cycle.

The control unit 60 further comprises an activation sensor 62 operatively linked to the control module 61 for controlling the activation of the control module 61. The activation sensor 62 can be a motion sensor, infrared sensor, and the like to detect the presence of the user. However, the activation sensor 62 is not arranged to actuate the relief valve 30. The activation sensor 62 is arranged to set the control module 61 in a "sleep" mode after a given unused time period of the flush apparatus. For example, when the unused time period is set for 2 hours, the control module 61 will be deactivated after 2 hours for stop starting the flushing cycle periodically in the timer flush mode. In particular, when the activation sensor 62 detects the presence of the user, the activation sensor 62 will start counting down the unused time period. If the activation sensor 62 detects the presence of another user within the unused time period, the activation sensor 62 will start counting down the unused time period again. If there is no detection signal of the activation sensor 62 after the unused time period, the control module 61 will be deactivated. As a result, the relief valve 30 will not be actuated to flush the flushing system. It will save lots of water during nighttime when no one uses the flushing system. It is worth mentioning that once the activation sensor 62 detects the presence of the user after the unused time period, i.e. during the "sleep" mode, the relief valve 30 will be actuated to flush the flushing system after the use of the flushing system and the control module 61 will be activated again to re-start the unused time period for the flushing cycle periodically.

It is worth mentioning that the activation sensor 62 and the sensor 442 can be two individual sensors for detection. It should be appreciated that the activation sensor 62 and the sensor 442 can be formed as an integrated sensor that when the control module 61 is set in the normal flush mode, the activation sensor 62 is arranged for detecting the presence of the user in order to actuate the relief valve 30. When the control module 61 is set in the timer flush mode, the activation sensor 62 is arranged to control the activation of the control module 61 in order to put the control module 61 into the "sleep" mode.

It is worth mentioning that when the control module 61 is set in the timer flush mode, the sensor 442 of the flush apparatus will be automatically deactivated, such that the relief valve 30 of the flush apparatus will not be actuated in response to the presence of the user via the sensor 442.

Figure 9:
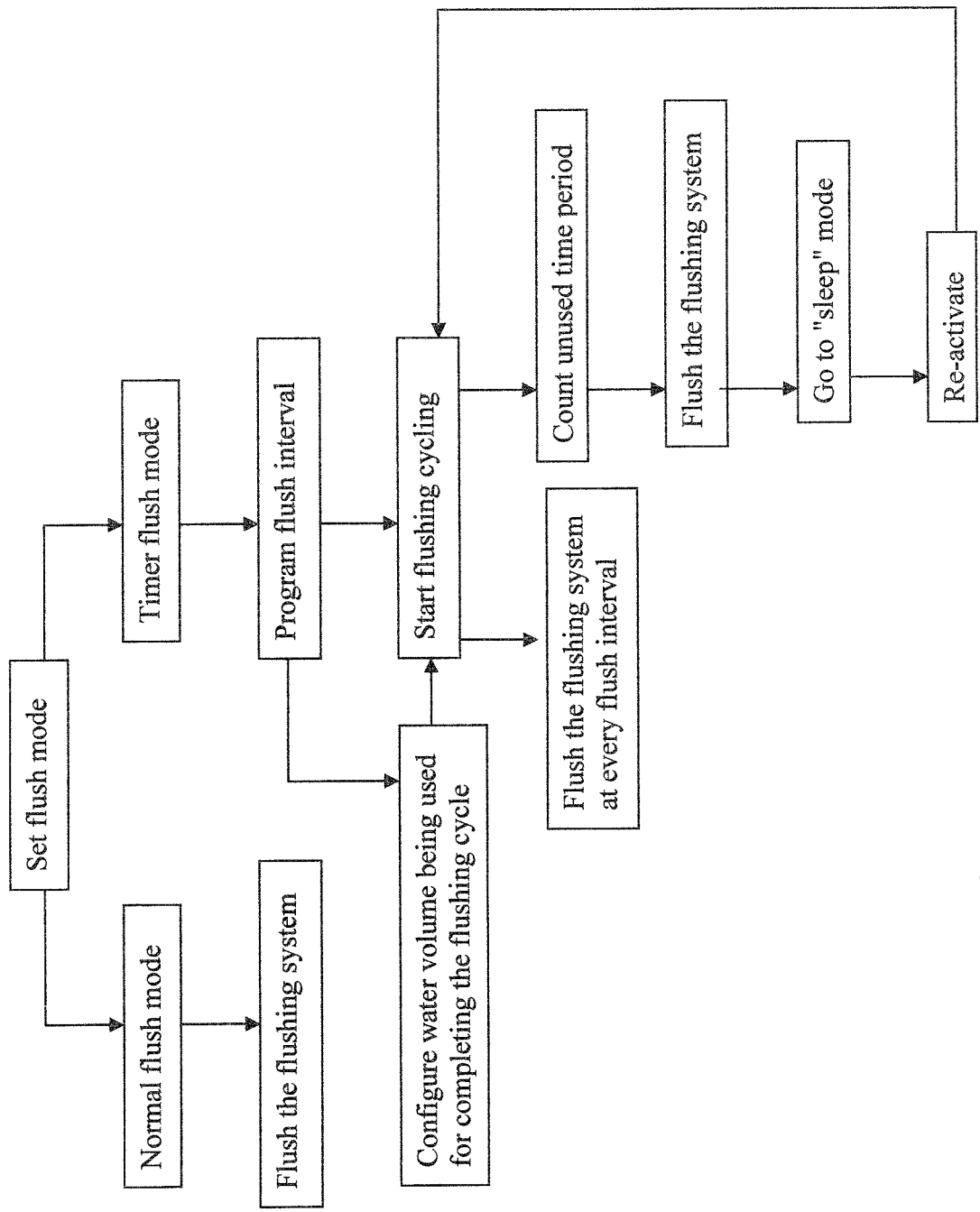
FIG. 9 is a flow diagram illustrating a method of controlling an actuation of the flush apparatus by the control device according to the above preferred embodiment of the present invention.

FIG. 9 illustrates the method of controlling the actuation of the flush apparatus, which comprises the following steps.

(1) For sensor-type flush apparatus, set the control module 61 in one of the normal flush mode and the timer flush mode. For non-sensor-type flush apparatus, the control module 61 will be automatically configured in the timer flush mode.

(2) In the timer flush mode, program the flush interval in the control module 61 to actuate the flush apparatus for completing a flushing cycle periodically. Accordingly, the time interval is set in the control module 61 to actuate the flush apparatus periodically.

(3) In the timer flush mode, enable the control module 61 to enter into the sleep mode to stop the actuation of the flush apparatus after the given unused time period of the flush apparatus. It is worth mentioning that during the sleep mode, the control module 61 will be re-activated to actuate the flush apparatus to complete the flushing cycle in response to a presence of user. Then, the unused time period will be re-started after the flushing cycle is completed.

Since the flushing system will not be flushed during the "sleep" mode, any residue may remain in the flushing system. In the step (3), before the control module 61 is entered into the "sleep" mode, the control module 61 will be activated to actuate the relief valve 30 to flush the flushing system. In other words, the flushing system will be flushed to ensure no residue remained in the flushing system right before the control module 61 is set in the "sleep" mode.

It is worth mentioning that the control unit 60 can be an individual component added-on to the automatic flush actuation apparatus 2 to actuate the relief valve 30 thereof. Likewise, the control unit 60 can be built-in with the automatic flush actuation apparatus 2 to actuate the relief valve 30 thereof.

Figure 10:
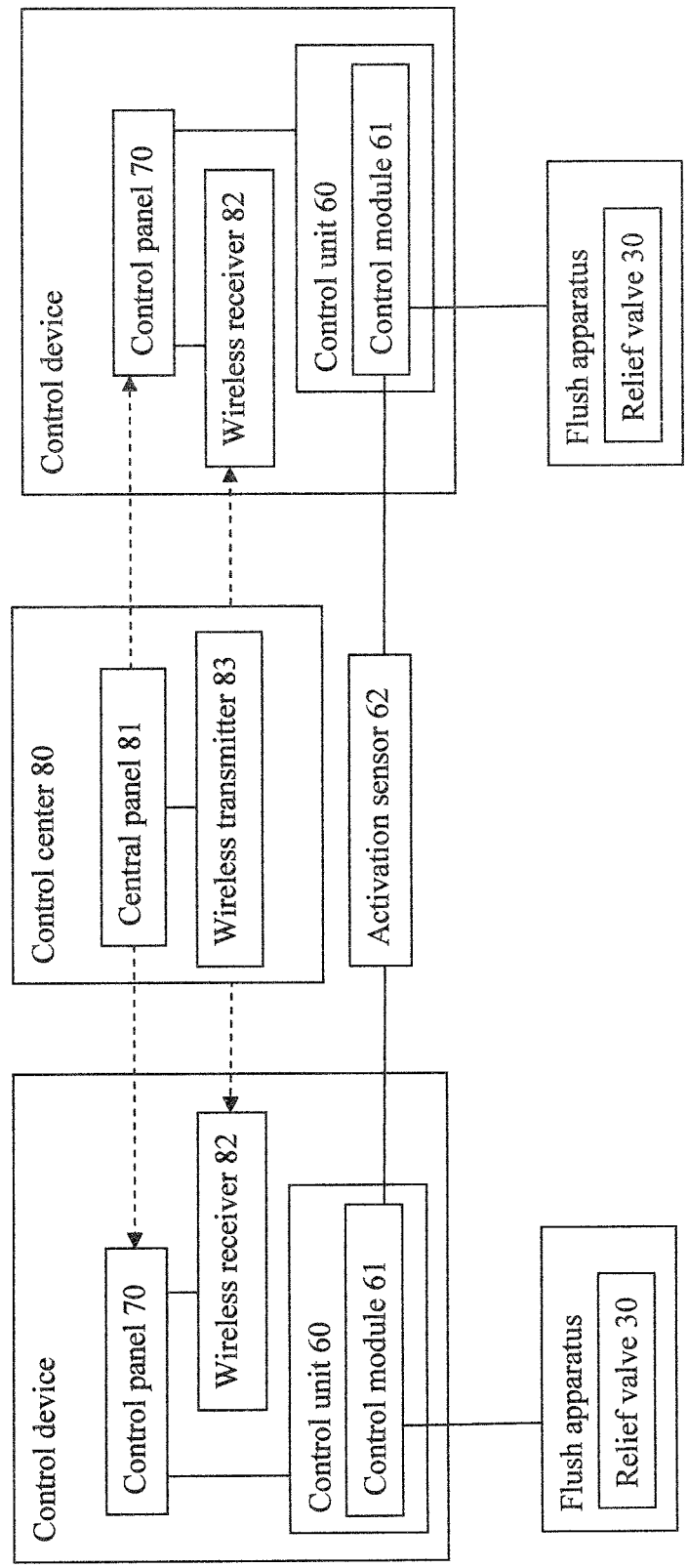
FIG. 10 is a block diagram illustrating the control device controlling a group of the flush apparatuses according to the above preferred embodiment of the present invention.

Furthermore, two or more control modules 61 can be shared with one activation sensor 62, as shown in FIG. 10. For example, when the activation sensor 62 is a motion sensor, the activation sensor 62 can be installed at an entrance of the restroom to detect the presence of the user. When the activation sensor 62 detects the presence of the user within the unused time period, all the control units 60 will remain active to flush all the flushing systems in the restroom periodically. If there is no detection signal of the activation sensor 62 after the unused time period, all the control modules 61 will be deactivated in the "sleep" mode.

As shown in FIG. 10, the control device further comprises a control center 80 electrically and operatively linking two or more control units 60 to adjustably control the control units 60 concurrently. Accordingly, the control center 80 comprises a central panel 81 as a centralized control operatively linked to the control panels 70 for operating the control panels 70. Therefore, the automatic flush actuation apparatuses 2 form a controlling group to be controlled by the control center 40. In other words, the manager is able to centrally manage the group of flushing systems by selectively controlling the control center 40 to concurrently control each of the control units 60.

Accordingly, the central panel 81 of the control center 80 preferably has the same configuration and functions of the control panel 70, which has a plurality central controlling switches to set the time interval for all the control units 60. Therefore, all the control units 60 will be concurrently controlled by the control center 80. For example, an on/off switch on the central panel 81 is arranged to selectively power on and off all the control units 60 concurrently.

According to the preferred embodiment, the control center 80 further comprises a wireless receiver 82 electrically connected to the control unit 60 for wirelessly receiving an activation signal to the control unit 60, so that the flushing configuration, such as the time intervals, is able to be remotely controlled via the wireless receiver 82 through Infrared, Radio Frequency, or Bluetooth connectivity. In other words, the wireless receiver 82 is adapted for wirelessly connecting with an external device, such as a remote controller, computer, mobile phone, PDA, or the like, so that the flushing configurations and/or flushing cycles can be remotely controlled through the external device via the wireless receiver 82. It is worth mentioning that the wireless receiver 82 enables the control unit 60 to be wirelessly controlled in a distance, so that the manger is able to remotely switch the settings of the time interval of the flushing configurations without bothering the user of the flushing system.

Preferably, the control center 80 further comprises a wireless transmitter 83 wirelessly connecting to the wireless receiver 82 at the control unit 60, wherein when the control center 80 is selectively operated, the wireless transmitter 83 will send out an activation signal to the corresponding wireless receivers 82. Accordingly, the control center 80 can control one particular control unit 60 or control two or more control units 60 as a group. In other words, when the wireless transmitter 83 sends the activation signal to the particular control unit 60, the control module 61 thereof will be controlled to be configured. Likewise, the group of the control units 60 is able to be remotely controlled in a distance by the control center 80.

It is worth mentioning that through a wireless connections method, such as "Bluetooth", infrared, or a communication network, such as internet, telecommunication network, satellite, or the like to wirelessly control and communicate with the control center 80, the group of control units 60 is able to be remotely controlled in a distance.

It is appreciated that the control center 80 enables the control units 60 being able to be remotely controlled from a control room or security guard station of a building, so as to be conveniently and centrally controlled. Thus, the flushing systems, especially those toilets in a public lavatory, are capable of being efficiently flushed to keep it clean.

It is worth mentioning that the control device can be incorporated with any flush apparatus with or without sensor equipped therewith. When the control device can be incorporated with the non-sensor type flush apparatus, the control device will be programmed to set the flush interval for the flush apparatus. Preferably, a power source will be provided in the control device in order to incorporate with the non-sensor type flush apparatus. The installation of the control device can be simple and easy by the steps of removing the flush lever 13 of the flush apparatus and attaching the control device to the flush apparatus. When the control device can be incorporated with the sensor type flush apparatus, the control device will be programmed to either the normal flush mode or the timer flush mode. Since the sensor type flush apparatus has its own power source 42, the control device can be equipped with the power source 42 of the sensor type flush apparatus.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method controlling actuation of a flush apparatus for a flushing system, comprising the steps of:
   (a) programming a flush interval, as a time interval, in a control module, remotely configured, that at every said flush interval, said flush apparatus is automatically and periodically actuated, independently to a presence of a user, to flush said flushing system until a flushing cycle thereof is completed by moving said flush apparatus from an opened position to a closed position, wherein said flush apparatus is powered by an electric motor and is actuated by the steps of:
   generating a rotational power by said electric motor to drive an actuator to rotate, wherein said actuator is downwardly and rotatably extended from said electric motor;
   via said rotational power from said electric motor, rotating said actuator from a first contacting surface to an opposed second contacting surface that when said second contacting surface of said actuator contacts with a valve stopper to move said flush apparatus to said opened position from said closed position; and
   rotating said actuator by said rotational power back to its original position that said first contacting surface of said actuator contacts with said valve stopper to move said flush apparatus from said opened position back to said closed position;
   (b) stop actuating said flush apparatus after a given unused time period of said flush apparatus;
   (c) enabling said flush apparatus to be actuated manually at any time by actuating a flush lever to push a valve member aside so as to move said flush apparatus to said opened position from said closed position, wherein said valve stopper is sat on said valve member, wherein said flush lever is pivotally moved to push said valve member for manually actuating said flush apparatus.

2. The method, as recited in claim 1, wherein the step (b) further comprises the steps of entering said control module into a sleeping mode after said given unused time period and actuating said flush apparatus to complete the flushing cycle before said control module enters into said sleep mode.

3. The method, as recited in claim 2, further comprising the steps of:
   operatively linking an activation sensor to said control module;
   during said sleep mode, re-activating said control module to actuate said flush apparatus to complete the flushing cycle in response to the presence of the user via said activation sensor, and
   re-starting said unused time period after said flushing cycle is completed to start counting down said unused time period.

4. The method, as recited in claim 2, further comprising a step of configuring water volume being used for completing the flushing cycle.

5. The method, as recited in claim 4, further comprising a default step of selectively setting said control module between a normal flush mode and a timer flush mode, wherein in said normal flush mode, said flush apparatus is actuated in response to the presence of the user of said flush apparatus, wherein in said timer flush mode, said flush apparatus is actuated periodically, such that said normal flush mode is a sensor-actuated mode and said timer flush mode is a non-sensor-actuated mode.

6. The method, as recited in claim 1, further comprising the steps of:
   operatively linking an activation sensor to said control module;
   during said sleep mode, re-activating said control module to actuate said flush apparatus to complete the flushing cycle in response to the presence of the user via said activation sensor, and
   re-starting said unused time period after said flushing cycle is completed to start counting down said unused time period.

7. The method, as recited in claim 1, further comprising a step of configuring water volume being used for completing the flushing cycle.

8. The method, as recited in claim 1, further comprising a default step of selectively setting said control module between a normal flush mode and a timer flush mode, wherein in said normal flush mode, said flush apparatus is actuated in response to the presence of the user of said flush apparatus, wherein in said timer flush mode, said flush apparatus is actuated periodically, such that said normal flush mode is a sensor-actuated mode and said timer flush mode is a non-sensor-actuated mode, wherein said flush lever is able to be manually actuated when said control module is set at either said normal flush mode or said timer flush mode.

9. A flush apparatus for a flushing system, comprising:
an electric motor for generating a rotational power;
a relief valve for flushing said flushing system until a flushing cycle thereof is completed by moving said flush apparatus from an opened position to a closed position, wherein said relief valve is powered by said electric motor and is actuated manually and automatically via a sensor in response to a presence of a user, wherein said relief valve comprises a valve member, a valve stopper sat on said valve member, and an actuator which has a first contacting surface and an opposed contacting surface, being driven to rotate by said rotational power of said electric motor to move said relief valve between said opened position and said closed position, wherein said actuator is downwardly and rotatably extended from said electric motor, wherein when said actuator is rotated that said second contacting surface of said actuator contacts with said valve stopper, said relief valve is moved at said opened position, when said actuator is rotated that said first contacting surface of said actuator contacts with said valve stopper, said relief valve is moved at said closed position, wherein when said valve member is moved aside, said relief valve is moved from said closed position to said opened position;
a flush lever being manually actuated pivotally at any time to push said valve member so as to move said flush apparatus to said opened position from said closed position; and
a control device which comprises a control module remotely configured with a flush interval, as a time interval, that at every said flush interval, said flush apparatus is automatically and periodically actuated independently to a presence of a user.

10. The flush apparatus, as recited in claim 9, wherein said control device further comprises an activation sensor operatively linked to said control module for enabling said control module to enter into a sleep mode to stop an actuation of said relief valve after a given unused time period of said flush apparatus, wherein, during said sleep mode, said sensor is deactivated and said activation sensor is activated for detecting the presence of the user in order to re-activate said control module and to re-start said unused time period, wherein said activation sensor is not arranged for activating said relief valve, wherein said flush lever is able to be manually actuated at said sleep mode.

11. The flush apparatus, as recited in claim 9, wherein said control device further comprises a control panel operatively linked to said control module to set a time interval in said control module to actuate said relief valve periodically.

12. The flush apparatus, as recited in claim 11, wherein said control panel comprises a volume control switch for selectively configuring water volume being used for completing the flushing cycle.

13. A control device for a flush apparatus having a sensor, a manual flush lever, and an electric motor to complete a flushing cycle for a flushing system, comprising:
a control module with a flush interval, as a time interval, remotely configured for automatically activating the electric motor to actuate said flush apparatus, wherein at every said flush interval, said flush apparatus is automatically and periodically actuated, independently to a presence of a user, to flush said flushing system until a flushing cycle thereof is completed by moving said flush apparatus from an opened position to a closed position, wherein said flushing cycle is adapted for being started via a manual operation of the manual flush lever at any time by pivotally actuating the manual flush lever;
an activation sensor operatively linked to said control module, wherein, in response to said activation sensor, said control module enters into a sleep mode to stop an actuation of said flush apparatus after a given unused time period of said flush apparatus, wherein, during said sleep mode, said activation sensor is activated for detecting the presence of the user in order to re-activate said control module and to re-start said unused time period, wherein said activation sensor is activated to start counting down said unused time period after a detection of the presence of the user and is not arranged for activating the electric motor to flush said flushing system; and
a control center which comprises a wireless transmitter wirelessly connected to a wireless receiver of said control module through Internet to remotely control said control module so as to selectively adjust said time interval thereof, wherein said control center is configured to wirelessly set said control module between a normal flush mode and a timer flush mode, wherein at said flush mode, said activation sensor is deactivated for enabling the flushing system to be independently actuated via the sensor of the flush apparatus in response to a presence of the user, wherein at said timer flush mode, said activation sensor is activated for actuating the flushing system in a timer manner while the sensor of the flush apparatus is deactivated.

14. The control device, as recited in claim 13, further comprising a control panel operatively linked to said control module to set a time interval in said control module to actuate said relief valve periodically.

15. The control device, as recited in claim 14, wherein said control panel comprises a volume control switch for selectively configuring water volume being used for completing the flushing cycle.

* * * * *